Figure 1:
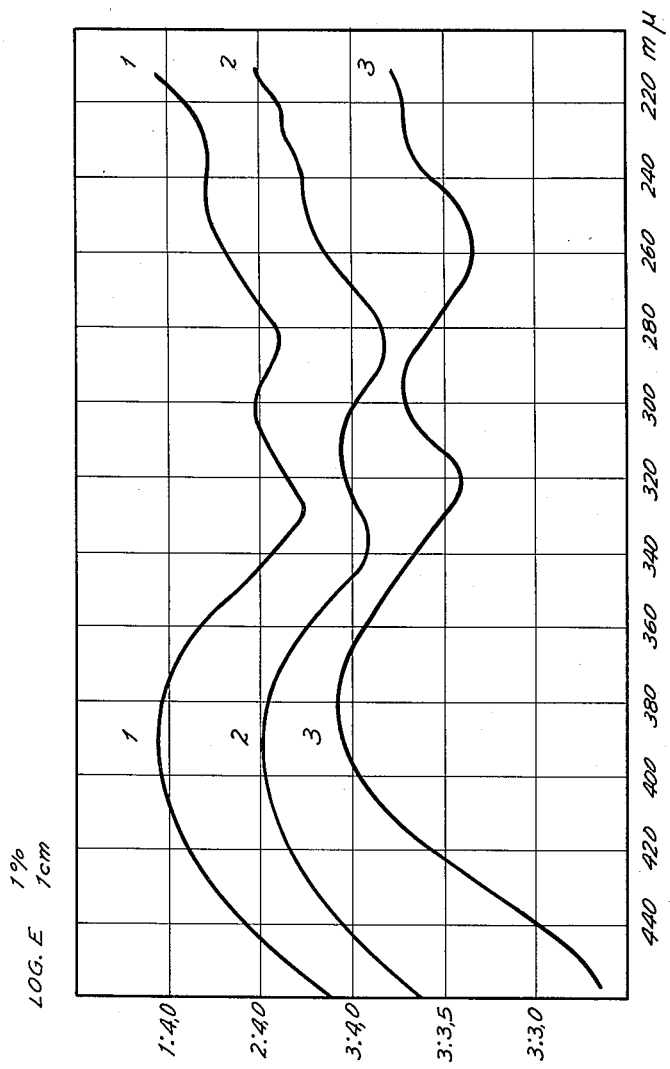

3,014,922
HOLOTHIN AND DERIVATIVES THEREOF
Ernst Gaeumann and Vladimir Prelog, Zurich, and Ernst Vischer, Basel, Switzerland, assignors to Ciba Pharmaceutical Products, Inc., Summit, N.J.
Filed July 23, 1959, Ser. No. 828,981
Claims priority, application Switzerland July 25, 1958
6 Claims. (Cl. 260—326.3)

The present invention relates to the manufacture of a new antibiotic which is designated as Holomycin. As will be shown hereinbelow, the antibiotic Holomycin contains an acetyl group that can be eliminated by acid hydrolysis. On the strength of the examination described below, the desacetyl derivative hereinafter called holothin corresponds to the formula I 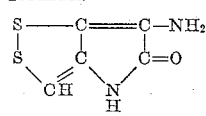

By acylation it yields acyl derivatives, the resulting acetyl derivative being identical with the antibiotic Holomycin.

Accordingly, the present invention relates to the desacetyl derivative holothin of the antibiotic Holomycin and the salts and acyl derivatives thereof, more especially to its lower alkanoyl derivatives, above all the acetyl derivative, that is to say the antibiotic Holomycin itself. These compounds correspond to the formula II 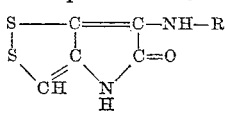

in which R represents hydrogen or an acyl radical, more especially a lower alkanoyl radical or phenyl lower alkanoyl radical, e.g. acetyl, phenyl acetyl.

The invention further covers pharmaceutical preparations that contain these compounds, as well as processes for the manufacture of these substances and mixtures of substances.

The antibiotic is produced from the culture of a new strain of the species *Streptomyces griseus* (Krainski) Waksman et Henrici, NRRL 2764 which is described below in greater detail; it was isolated from a sample of soil taken at Riccino, Italy, and is kept in our laboratories and at the Federal Institute of Technology, Institute for Special Botanic, Zurich, under the reference A 17 474.

The strain NRRL 2764 forms a yellowish-greenish-grey air mycelium. The substratum mycelium is whitish yellow or whitish grey to intense yellow. The spore chains are made up from smooth spores, are generally strongly wavy and form sympodially branched bundles with a short main axis. When it is grown on peptone-containing nutrients, no melanoidal, black-brown discoloration is observed. The growth is relatively little dependent on the temperature: the fungus develops well both at 18° C. and at 40° C., though the optimum is between 25 and 32° C.

To characterise the strain NRRL 2764 further, its growth on various nutrients is described below. The nutrients 1–7 and 10 were prepared as described by W. Lindenbein, in Arch. Mikrobiol. 17, p. 361 [1952].

(1) Synthetic agar ----- Growth thin, veil-like, whitish yellow; air mycelium velvety, snow white.
(2) Synthetic nutrient solution ----------- Sparse, whitish yellow basic growth and few flocks; good surface growth with chalk-white air mycelium.
(3) Glucose-agar ----- Growth wrinkly, deep yellow; substratum deep yellow; air mycellium chalk-white.
(4) Glucose-asparagine-agar ----------- Growth thin, veil-like, whitish yellow whitish grey; air mycelium velvety, whitish yellow to yellow-green-grey.
(5) Calcium malate-agar ---------------- Growth thin, veil-like, whitish grey substratum brick red; air mycelium sparse, snow white.
(6) Gelatin stab (18° C.) ----------- Surface growth, sparse, wrinkly to lichen-like; substratum not discolored; air mycelium yellow-green-grey; liquefaction slow, after 30 days about 0.3 cc.
(7) Starch plate -------- Growth pustular, whitish yellow; air mycelium velvety, yellow-green-grey; hydrolysis after 7 days 1.3 cc.
(8) Potatoes --------- Growth thin, veil-like to wrinkly; air mycelium velvety, whitish yellow to yellow-green-grey.
(9) Carrots ---------- Growth very sparse, point-like, whitish yellow.
(10) Litmus milk ------ Very strongly developed pellicules, pale yellow; air mycelium dusty, forming a fine coating, snow white; slow peptonisation: 0.5 cc. in 8 days; no coagulation; litmus decolorised or changed to blue.

It is known that different strains of *Streptomyces griseus* form different antibiotics (see, for example, Waksman and Lechevalier, "Antinomycetes and their Antibiotics," Baltimore 1953, page 166). Consequently, the formation of a certain antibiotic cannot be looked upon as a characteristic property of a certain species of Streptomycetes, but merely as a characteristic feature of a certain Streptomycetes strain (see Ettlinger et al., Arch. Mikrobiol. 31, 326–358 (1958)). The following antibiotics are produced by different strains of the species *Streptomyces griseus:* Streptomycin, Mannosidostreptomycin, Grisein, Streptocin, Candicidin and Actidion (cycloheximide). As will be shown below, the new antibiotic Holomycin differs from all these substances in a characteristic manner.

Insofar as the manufacture of the antibiotic Holomycin is concerned, the present invention is not limited to the use of the strain NRRL 2764 or other organisms corresponding to the above description; it covers likewise the use of variants of these Streptomycetes such as are obtained, for example, by selection or mutation, more especially under the action of ultra-violet or X rays or of nitrogen-mustard oils.

To prepare the antibiotic, a strain of *streptomyces griseus* possessing the properties of NRRL 2764 is cultivated under aerobic conditions in an aqueous nutrient solution containing inorganic salts and a nitrogen and carbon source, until it displays a substantial antibacterial action, and the antibiotic Holomycin is isolated.

The inorganic salts contained in the nutrient solution may be for example, chlorides, nitrates, carbonates or sulfates of alkali metals or alkaline earth metals, of magnesium, iron, zinc, manganese. Carbon sources are above all carbohydrates such as glucose, saccharose, lactose or starch. As examples of nitrogenous compounds—and growth promoters that are added if desired—may be mentioned: amino acids and mixtures thereof, peptides and proteins as well as hydrolysates thereof such as peptone or tryptone, meat extracts, water-soluble constituents of grain such as maize or wheat, of distillation, residues in the manufacture of alcohol, of yeast, beans (especially soyabeans), or of seeds, for example, cotton seeds.

The culture is produced under aerobic conditions, that is to say for instance in a quiescent surface culture or preferably submerged, with shaking or stirring with air or oxygen in shaking bottles or the known fermenters. A suitable temperature ranges from about 18 to 40° C., preferably about 35–37° C. In general, the nutrient solution cultivated under these conditions displays a substantial antibacterial action after 15 to 72 hours.

The antibiotic Holomycin can be isolated, for example, by the following methods: The mycelium is separated from the culture filtrate, whereupon the bulk of the antibiotic is found in the culture filtrate. Still, a substantial share of the antibiotic remains adsorbed on the mycelium; it is therefore of advantage to thoroughly wash the latter. This can be performed particularly advantageously with an organic, at least partially water-miscible, solvent such as an alcohol, for example, a lower alkanol, i.e. methanol, ethanol or a butanol, or a ketone such as acetone or methylethyl ketone, or other such di-lower alkyl ketone. These mycelium extracts are combined with the culture filtrate as they are or alternatively after having first been concentrated in vacuo. The mixture is extracted with a water-immiscible organic solvent such as an ester (particularly a lower alkyl ester) of a lower fatty acid, for example ethyl acetate, amyl acetate etc., or a hydrocarbon such as benzene, toluene, nitrobenzene, hexane etc., or a chlorinated hydrocarbon, such as a chlorinated lower alkane, e.g., ethylene chloride, methylene chloride, chloroform etc., or a ketone, such as a di-lower alkyl ketone, e.g., methylpropyl ketone, methylamyl ketone, diisobutyl ketone, etc., or an alcohol, such as a lower alkanol, e.g. a butanol or an amyl alcohol etc., an ether, such as a di-lower alkyl ether, e.g., ethyl ether, diisopropyl ether, dibutyl ether, glycol ether etc., or the like. Instead of a solvent-extraction of the culture, or in conjunction therewith as a further purification operation, the antibiotic can also be obtained by adsorption, for example, on active carbon or on an activated diatomaceous earth such as fuller's earth or Floridin, followed by extraction of the adsorbate, for example with an organic solvent that is at least partially water-miscible, such as acetone, a butanol, or methylethylketone.

Alternatively, the culture can be extracted directly in the manner described above, without first isolating the mycelium.

A further enrichment can be achieved by extracting the organic extracts containing the antibiotic first with an acid aqueous solution (pH=below 5) and then repeatedly with an alkaline aqueous solution (pH=over 8), whereupon the bulk of the antibiotic activity remains in the organic phase from which Holomycin is then isolated. A suitable acid aqueous solution is a dilute acid, such as acetic acid, hydrochloric acid or sulfuric acid, or a buffer solution such as a solution of a citrate or phosphate buffer; suitable alkaline aqueous solutions are dilute alkalies, such as sodium hydroxide solution or potassium hydroxide solution, or a buffer solution such as a phosphate buffer, or the like.

A good method of purifying the new antibiotic Holomycin is chromatography. Particularly good results as adsorbent have been obtained with alumina, though other adsorbents, such as silica gel, magnesium silicate or the like, are equally suitable.

Another very useful method of enriching the new antibiotic Holomycin is the distribution between an aqueous solution and a water-immiscible solvent. This distribution is advantageously performed by the counter-current method in a suitable apparatus.

The pure antibiotic in crystalline form is prepared, for example, from an organic solvent such as a di-lower alkyl ketone (e.g. acetone), a lower alkanol (e.g. methanol, ethanol), a di-lower alkyl ether (e.g. diethylether), a lower alkyl ester of a lower fatty acid (e.g. ethyl acetate), a chlorinated lower alkane (e.g. chloroform), lower alkanes (e.g. pentane, hexane), mixtures of these solvents, such as ethyl acetate and methanol, or ethyl acetate and diethyl ether, or ethyl acetate and petroleum ether. For recrystallization the same solvent or an aqueous organic solution may be used such as dilute ethanol alcohol, dilute acetone or the like. Another way to purify the antibiotic is by sublimation under high vacuum.

Figure 2:
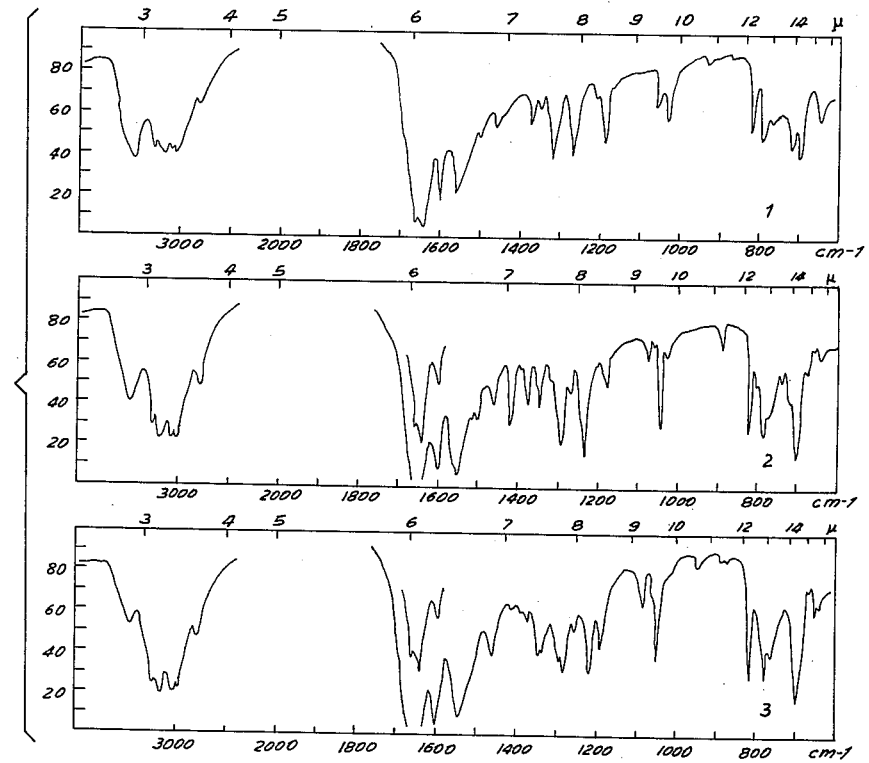

The antibiotic Holomycin is obtained in the form of orange-colored crystal flakes melting at 264–271° C. Its elementary analysis yields the following data:

$C=39.25\%$; $H=2.79\%$; $N=13.07\%$; $S=29.77\%$ $(C)CH_3=7.04\%$; $CH_3CO=21.38\%$. These values suggest the formula $C_7H_6O_2N_2S_2$, the substance being free from O-methyl and N-methyl groups but containing one C-methyl and acetyl group each. The ultra-violet absorption spectrum (cf. FIG. 1, curve 1) contains three bands: at 245 m$\mu$ (log $\epsilon=3.78$), at 302 m$\mu$ (log $\epsilon=3.51$) and at 390 m$\mu$ (log $\epsilon=4.05$). The infra-red spectrum (cf. FIG. 2, curve 1) contains inter alia bands at: 2.91$\mu$, 3.10$\mu$, 3.18$\mu$, 3.27$\mu$, 3.31$\mu$, 6.02$\mu$, 6.10$\mu$, 6.25$\mu$, 6.44$\mu$, 6.86$\mu$, 7.30$\mu$, 7.42$\mu$, 7.58$\mu$, 7.89$\mu$, 8.38$\mu$, 9.49$\mu$, 9.68$\mu$, 12.10$\mu$, 12.65$\mu$, 12.98$\mu$, 13.90$\mu$, 14.25$\mu$ and 15.35$\mu$. Holomycin is a neutral substance and contains no readily acylatable hydroxyl group.

Figure 3:
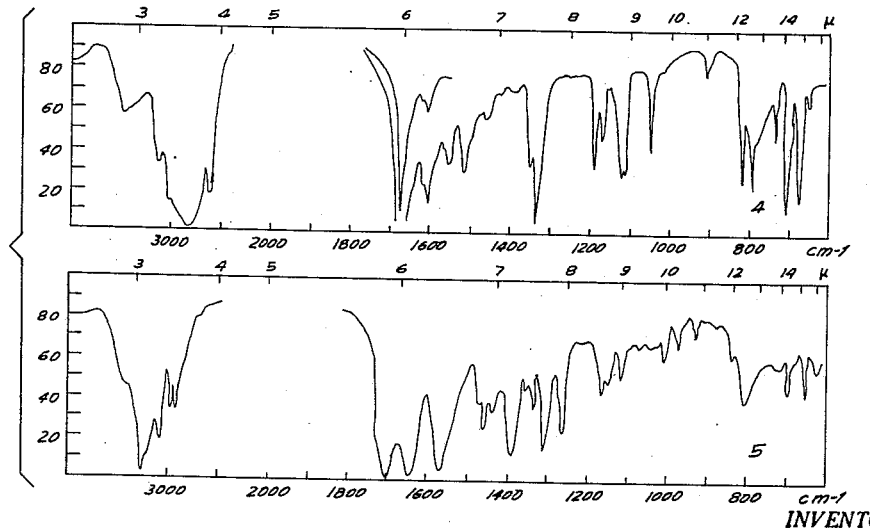

The acid hydrolysis, accompanied by the elimination of acetic acid, yields a basic cleavage product which is obtained as the hydrochloride in crystalline form. Its elementary analysis gives the following data: $C=29.06\%$; $H=2.54\%$; $N=13.35\%$; $S=30.56\%$ and $Cl=16.74\%$, which suggest the empirical formula $C_5H_5ON_2S_2Cl$. The ultraviolet absorption spectrum (cf. FIG. 1, curve 3) contains three bands: at 226 m$\mu$ (log $\epsilon=3.70$), at 296 m$\mu$ (log $\epsilon=3.70$) and at 381 m$\mu$ (log $\epsilon=4.08$). The infrared spectrum is shown in FIG. 3, curve 4.

By treatment with an acylating agent, for example an anhydride or halide, such as the chloride of a carboxylic acid, the corresponding acylated compounds are obtained. When acetic anhydride is used, Holomycin is obtained which possesses the properties mentioned above. The aforementioned basic cleavage product is, therefore, the desacetyl derivative of the anti-biotic Holomycin. When the desacetyl derivative is reacted with propionic acid anhydride or with n-butyric acid anhydride, the propionyl or butyryl derivative respectively is obtained; the former melts at 250–260° C. with decomposition, the latter at 215–218° C. The desacetyl derivative can be converted into salts thereof in the usual manner.

When Holomycin is treated with a desulfurizing agent, for example with a Raney nickel catalyst, a colorless, sulfur-free compound $C_7H_{12}O_2N_2$ of the formula

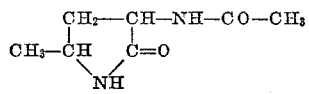

According to its physical and chemical properties, as well as the degradation products obtained from it, Holomycin is closely related to the antibiotic Thiolutin (W. D. Celmer, J. A. Solomons, Antibiotic Annual 1953/54, page 622; W. D. Celmer, F. W. Tanner, M. Harfenist, T. M. Lees, J. A. Solomons, J. Amer. Chem. Soc. 74, page 6304 [1952]; W. D. Celmer, J. A. Solomons, J. Amer. Chem. Soc. 77, page 2861 [1955]). However, the fact that these two antibiotics are different is revealed by the melting point depression of 20° of a mixture of the two substances, by their infra-red spectra and by their different behaviour under paper chromatographic examination. When the two solvents systems A (stationary phase: formamide; mobile phase: benzene) and B (stationary phase: sodium meta-cresotinate; mobile phase: a 3:1 mixture of n-butyl acetate and di-n-butyl ether) are used, Holomycin and its homologues reveal the following $R_{Th}$-values, $R_{Th}$ being the relationship between the distance through which the product under examination runs to the distance covered by Thiolutin:

|  | System A | System B |
| --- | --- | --- |
| Thiolutin | 1.00 | 1.00 |
| Aureothricin | 1.47 | 1.62 |
| Butyryl-pyrothin | 1.76 | 2.10 |
| Holomycin | 0.10 | 0.78 |
| Propionyl holothin | 0.28 | 1.50 |
| Butyryl holothin | 0.52 | 1.87 |

On the strength of the above examination results, Holomycin is accorded the Formula II ($R=COCH_3$), the desacetyl derivative the Formula I, and the propionyl and butyryl compound, respectively, the Formula II ($R=COCH_2CH_3$ and $R=COCH_2-CH_2CH_3$ respectively).

Holomycin differs from the known antibiotics produced by the other strains of the species *Streptomyces griseus*. In contradistinction to Holomycin, Streptomycin, Mannosidostreptomycin and Grisein cannot be extracted from the culture filtrate with organic solvents, and they possess basic properties. Actidion (cycloheximide) and Candicidin have a melting point different from that of Holomycin as well as a different antibiotic activity spectrum. The latter is likewise true of Streptocin. From all these known antibiotics, Holomycin differs also by its absorption spectrum in ultra-violet and infra-red light and—with the exception of Grisein—also by its inherent color.

The antibiotic Holomycin, the desacetyl derivative and quite generally acyl compounds of the latter—more especially the propionyl and n-butyryl compounds which are homologous to the antibiotic Holomycin—possess a very high antibiotic activity towards various test organisms. When as test method in vitro dilution series (powers of ten) in glucose bouillon are used, which have been incubated for 24 hours at 37° C., the following concentrations still have an inhibitive action:

| Test organism | Inhibiting concentration, µg./cc. | | | |
| --- | --- | --- | --- | --- |
|  | Holomycin | Holothin | Propionyl compound | Butyryl compound |
| *Micrococcus pyogenes*, va. aureus | 100 | >100 | >100 | >100 |
| *Micrococcus pyogenes*, var. aureus, Penicillin-resistant | 10 | >100 | >100 | >100 |
| *Streptococcus pyogenes* | 1 | 100 | 10 | 10 |
| *Streptoccocus viridans* | 10 | 100 | 100 | 100 |
| *Streptococcus faecalis* | 100 | 100 | 100 | >100 |
| *Corynebacterium diphtheriae* | 1 | 10 | 1 | 0.1 |
| *Escherichia coli* | 10 | >100 | 100 | 100 |
| *Escherichia coli*, Chloromycetin-resistant | 10 | >100 | 100 | 100 |
| *Escherichia coli*, Streptomycin-resistant | 10 | >100 | 100 | 100 |
| *Salmonella typhosa* | 10 | 100 | 10 | 10 |
| *Salmonella schottmuelleri* | 10 | 100 | 100 | 100 |
| *Shigella sonnei* | 10 | 100 | 100 | 100 |
| *Pseudomonas aeruginosa* | 100 | >100 | >100 | >100 |
| *Klebsiella* type A | 10 | 100 | 10 | >100 |
| *Pasteurella pestis* | 0.1 | 10 | 1 | 10 |
| *Vibrio cholerae* el Tor | 10 | 100 | 10 | 10 |
| *Bacillus megatherium* | 10 | 100 | 10 | 10 |
| *Endomyces albicans* | 100 | >100 | >100 | 100 |

In addition to the compounds mentioned hereinbefore and the processes for their manufacture, the present invention covers the hydrogenating desulfurisation of these compounds and the products resulting therefrom.

The new compounds and appropriate mixtures thereof can be used as medicaments, for example in the form of pharmaceutical preparations, which contain the aforementioned compounds in conjunction with a pharmaceutical organic or inorganic excipient suitable for enteral, parenteral or local administration. Suitable excipients are substances that do not react with the new compounds such, for example, as gelatin, lactose, starches, magnesium stearate, talc, vegetable oils, benzyl alcohols, gums, polyalkylene glycols, white petroleum jelly, cholesterol or other known pharmaceutical excipients. The pharmaceutical preparations may be, for example, tablets, dragees, powders, ointments, creams, suppositories or, in liquid form, solutions, suspensions or emulsions. If desired, they may be sterilized and/or contain auxiliaries such as preserving, stabilizing, wetting or emulsifying agents. They may also contain further therapeutically useful substances.

The invention further covers any variant of the present process in which the starting material used is an intermediate obtained at any stage of the process, and the remaining step or steps are carried out, or the process is discontinued at any desired stage thereof.

The following examples illustrate the invention without thereby in any way limiting its scope.

Example 1

A nutrient solution is prepared which contains in 1 liter of tap water 20 grams of distillers' solubles, 20 grams of malt extract, 1 gram of sodium nitrate, 5 grams of sodium chloride, and it is adjusted to pH=7.5. This solution, or a multiple volume thereof, is introduced into Erlenmeyer flasks of 500 cc. capacity in portions of 100 cc. each, or into 500-liter-fermenters (300 liters of nutrient solution per fermenter), and the solution is sterilized for 20–30 minutes under a pressure of 1 atmosphere (gauge). Each solution is then inoculated with up to 10% of a partially sporulating, vegetative culture of the Streptomyces strain NRRL 2764 and incubated with good shaking or stirring—and in the fermenters with aeration with about 1 volume of sterile air per volume of nutrient solution per minute—at 27° C., whereupon an antibacterial activity develops in the cultures. After the cultures have been allowed to grow for 18–72 hours, they are filtered with the addition of a filter aid, depending on their volume through a suction filter or a filter press or a rotary filter, and the antibiotically active aqueous solution is thus freed from the mycelial mass and other solid matter.

Example 2

When, instead of the nutrient medium described in Example 1, one of the under-mentioned nutrient solutions (a) to (g) is used, and the cultures are sterilised, inoculated with the Streptomyces strain NRRL 2764, incubated at 27° C. and filtered in identical manner, aqueous solutions of antibacterial activity are obtained.

(a) 10 grams of crude glucose, 5 grams of peptone, 3 grams of meat extract (Oxo Lab Lemo), 5 grams of sodium chloride, 10 grams of calcium carbonate and 1 liter of tap water; pH, prior to sterilization: 7.5.

(b) 10 grams of crude glucose, 10 grams of distillers' solubles, 1 gram of sodium nitrate, 5 grams of sodium chloride, 10 grams of calcium carbonate and 1 liter of tap water; pH, prior to sterilization: 7.5.

(c) 10 grams of crude glucose, 10 grams of soyabean flour, 20 cc. of corn steep liquor, 5 grams of sodium chloride, 1 gram of sodium nitrate, 10 grams of calcium carbonate and 1 liter of tap water: pH, prior to sterilization: 7.5.

(d) 20 grams of glycerol, 10 grams of soyabean flour, 5 grams of sodium chloride, 1 gram of sodium nitrate, 10 grams of calcium carbonate and 1 liter of tap water; pH, prior to sterilization: 7.5.

(e) 20 grams of lactose, 20 grams of distillers' solubles, 5 grams of sodium chloride, 1 gram of sodium nitrate and 1 liter of tap water; pH, prior to sterilization: 8.0.

(f) 3 grams of casein, 2 grams of secondary potassium hydrophosphate, 10 grams of crude glucose and 1 liter of tap water; pH, prior to sterilization: 7.5.

(g) 20 grams of mannitol, 20 grams of soyabean flour and 1 liter of tap water; pH, prior to sterilization: 7.8.

*Example 3*

The filter residue from a 150-liter batch obtained as described in Example 1 or 2 is pasted with 25 liters of acetone and again filtered. This is repeated twice more, whereupon the acetonic solutions of the antibiotic are combined, concentrated in vacuo to 5 liters and combined with the culture filtrate. This solution is extracted with 70 liters of ethyl acetate, with the whole of the antibacterial activity passing into the organic phase. The extract is washed with water, concentrated in vacuo to 5 liters and then repeatedly extracted by shaking with 0.5 N-acetic acid and with 2 N-sodium hydroxide solution. Finally, the ethyl acetate solution is dried over sodium sulfate and evaporated in vacuo, whereby the crude antibiotic Holomycin is obtained in the form of a brown oil.

*Example 4*

100 grams of the crude antibiotic Holomycin obtained as described in Example 3 are chromatographed on a column of 2 kg. of alumina (activity III) by the fractional elution method in the system chloroform, chloroform+methanol, and methanol. The individual fractions (4 liters each) are evaporated in vacuo and examined for their antibiotic activity. The fractions obtained by elution with chloroform and 99:1-mixtures of chloroform+methanol contain only inactive by-products, whereas the fractions eluted with 97:3-mixtures of chloroform+methanol are of yellow colour and highly active; they are combined and crystallized from ethyl acetate. Holomycin is obtained in the form of orange-yellow flasks melting at 264–271° C. Mixed melting point with Thiolution: 240–245° C. The elementary analysis of the compound reveals the following data: C=39.25%; H=2.79%; N=13.07%; S=29.77%; C(CH$_3$)=7.04%; CH$_3$CO=21.38%; N(CH$_3$)=0%; OCH$_3$=0%. The ultra-violet spectrum in rectified alcohol (cf. FIG. 1, curve 1) contains three bands: at 245 m$\mu$ (log $\epsilon$=3.78), 302 m$\mu$ (log $\epsilon$=3.51) and 390 m$\mu$ (log $\epsilon$=4.05). The infra-red spectrum in potassium bromide (cf. FIG. 2 curve 1) contains inter alia bands at the following wavelengths: 2.91$\mu$, 3.10$\mu$, 3.18$\mu$, 3.27$\mu$, 3.31$\mu$, 6.02$\mu$, 6.10$\mu$, 6.25$\mu$, 6.44$\mu$, 6.86$\mu$, 7.30$\mu$, 7.42$\mu$, 7.58$\mu$, 7.89$\mu$, 8.38$\mu$, 9.49$\mu$, 9.68$\mu$, 12.10$\mu$, 12.65$\mu$, 12.98$\mu$, 13.90$\mu$, 14.25$\mu$ and 15.35$\mu$.

*Example 5*

5.7 grams of the crude antibiotic Holomycin obtained as described in Example 3 are subjected to a 82-stage countercurrent distribution, a 1:1 mixture of ethyl acetate+water being used as the solvent system.

The content of the distribution vessels which are most intensively coloured are combined. The aqueous phase is separated and extracted twice with fresh ethyl acetate. The ethyl acetate extracts are combined, dried over sodium sulfate and extensively concentrated in vacuo, whereby Holomycin is caused to separate in organe-yellow crystals melting at 264–271° C.

*Example 6*

A solution of 500 mg. of Holomycin in 25 cc. of dioxane is heated to the boil, treated with 5 cc. of concentrated hydrochloric acid and then refluxed for 45 minutes. On cooling, the reaction solution yields the crude hydrochloride of holothin acetylated compound in the form of greenish black crystals which are recrystallized from 90 cc. of hot 2 N-hydrochloric acid. At 240–260° C. the olive-green leaflets having a metallic lustre gradually lose their double refraction but do not melt at temperatures up to 300° C. The elementary analysis reveals the following data: C=29.06%; H=2.54%; N=13.35%; S=30.56%; Cl=16.74%. The ultra-violet spectrum in rectified alcohol (cf. FIG. 1, curve 3) contains three bands: at 226 m$\mu$ (log $\epsilon$=3.70), 296 m$\mu$ (log $\epsilon$=3.70) and 381 m$\mu$ (log $\epsilon$=4.08). The infrared spectrum in potassium bromide is shown in FIG. 3, curve 4.

*Example 7*

A solution of 133 mg. of the hydrochloride of holothin, obtained as described in Example 6, in 13 cc. of water is mixed while being stirred with 2 cc. of acetanhydride, whereupon Holomycin separates in the form of orange-yellow crystals. The whole is left to itself for ½ hour, filtered and the residue is recrystallized from methanol+ethyl acetate; the product melts at 264–271° C. The crystallizate obtained in this manner is in every respect identical with the Holomycin described in Example 5.

*Example 8*

3 cc. of propionic anhydride are stirred into a solution of 130 mg. of the hydrochloride of the desacetylated compound, obtained as described in Example 6, in 14 cc. of water. An orange-yellow crystalline precipitate is formed which is filtered off, after allowing the reaction mixture to stand for ½ hour, and then recrystallized from a mixture of methanol and ethyl acetate. The propionyl compound thus obtained melts at 250–260° C. with decomposition. Elementary analysis: C=41.91%; H=3.45%; N=12.26%; S=28.17%. The ultra-violet spectrum (in rectified alcohol) contains three bands: at 245 m$\mu$ (log $\epsilon$=3.78), 302 m$\mu$ (log $\epsilon$=3.51) and 390 m$\mu$ (log $\epsilon$=4.05). It is identical with that of Holomycin (cf. FIG. 1, curve 1). In the infra-red spectrum in potassium bromide (cf. FIG. 2, curve 2) the following bands are visible inter alia: 2.88$\mu$, 3.06$\mu$, 3.16$\mu$, 3.25$\mu$, 3.30$\mu$, 6.02$\mu$, 6.09$\mu$, 6.25$\mu$, 6.43$\mu$, 6.84$\mu$, 7.07$\mu$, 7.26$\mu$, 7.42$\mu$, 7.71$\mu$, 8.10$\mu$, 8.45$\mu$, 9.27$\mu$, 9.52$\mu$, 11.20$\mu$, 12.15$\mu$, 12.68$\mu$, 14.15$\mu$ and 15.50$\mu$.

*Example 9*

2 cc. of butyric anhydride are stirred into a solution of 110 mg. of the hydrochloride of the desacetylated compound, obtained as described in Example 6, in 18 cc. of water, whereupon the butyryl compound separates cut in the form of orange-yellow crystals. It is recrystallized from methanol and melts at 215–218° C. Elementary analysis: C=44.57%; H=4.25%; N=11.56%; S=26.10%. The ultra-violet spectrum in rectified alcohol contains three bands: at 245 m$\mu$ (log $\epsilon$=3.78), 302 m$\mu$ (log $\epsilon$=3.51) and 390 m$\mu$ (log $\epsilon$=4.05) and is identical with that of holothin. The infra-red spectrum in potassium bromide (cf. FIG. 2, curve 3) reveals inter alia bands at: 2.89$\mu$, 3.08$\mu$, 3.17$\mu$, 3.30$\mu$, 3.35$\mu$, 6.01$\mu$, 6.09$\mu$, 6.25$\mu$, 6.47$\mu$, 6.84$\mu$, 7.41$\mu$, 7.47$\mu$, 7.71$\mu$, 7.79$\mu$, 7.95$\mu$, 8.20$\mu$, 8.39$\mu$, 9.15$\mu$, 9.50$\mu$, 10.50$\mu$, 11.18$\mu$, 11.33$\mu$, 12.15$\mu$, 12.75$\mu$, 13.05$\mu$, 14.25$\mu$, 15.25$\mu$, and 15.55$\mu$.

*Example 10*

A solution of 206 mg. of Holomycin in 70 cc. of ethanol is treated with 2 grams of Raney nickel. The suspension is refluxed for 2 hours. The solution is freed from the suspended nickel catalyst by filtration and evaporated in vacuo. Treatment of the residue with acetone yields the product of the formula

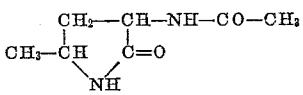

in the form of colorless needles. These are purified by chromatography over activated silicic acid and elutration with a 19:1 mixture of chloroform and methanol. After one recrystallization from acetone and sublimation in a high vacuum, the crystals melt at 188;189° C. Elementary analysis: C=53.90%; H=7.52%; N=17.90% (N)CH$_3$=0%. The ultra-violet absorption spectrum in rectified alcohol displays only a weak final absorption at 210 mμ. The infrared spectrum in potassium bromide is shown in FIG. 3, curve 5.

*Example 11*

A solution of 50 mg. of the product obtained as described in Example 10, in 10 cc. of a 1:1-mixture of concentrated hydrochloric acid and water is refluxed for 4 hours. The reaction mixture is evaporated in vacuo. Crystallization yields pure α:γ-diamino-valeric acid which under paper-chromatographic examination with phenol saturated with water reveals an $R_f$ value of 0.24.

What is claimed is:

1. A compound of the formula

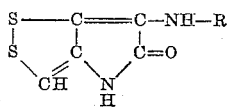

in which R represents a member selected from the group consisting of hydrogen, lower alkanoyl and phenyl lower alkanoyl.

2. A compound selected from the group consisting of compounds of the formula:

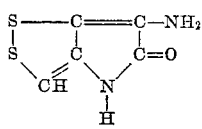

and its non-toxic acid addition salts.

3. A non-toxic acid addition salt of the compound of claim 6.

4. A non-toxic acid addition salt of the compound of claim 2.

5. A compound of the formula:

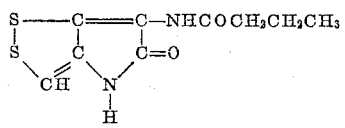

6. A compound of the formula:

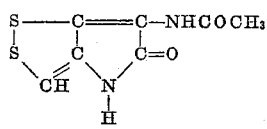

References Cited in the file of this patent

UNITED STATES PATENTS

| | | |
|---|---|---|
| 2,689,854 | Tanner et al. | Sept. 21, 1954 |
| 2,691,618 | Tanner et al. | Oct. 12, 1954 |
| 2,752,359 | Celmer | June 26, 1956 |
| 2,851,463 | Hinman et al. | Sept. 9, 1958 |